Fig. I
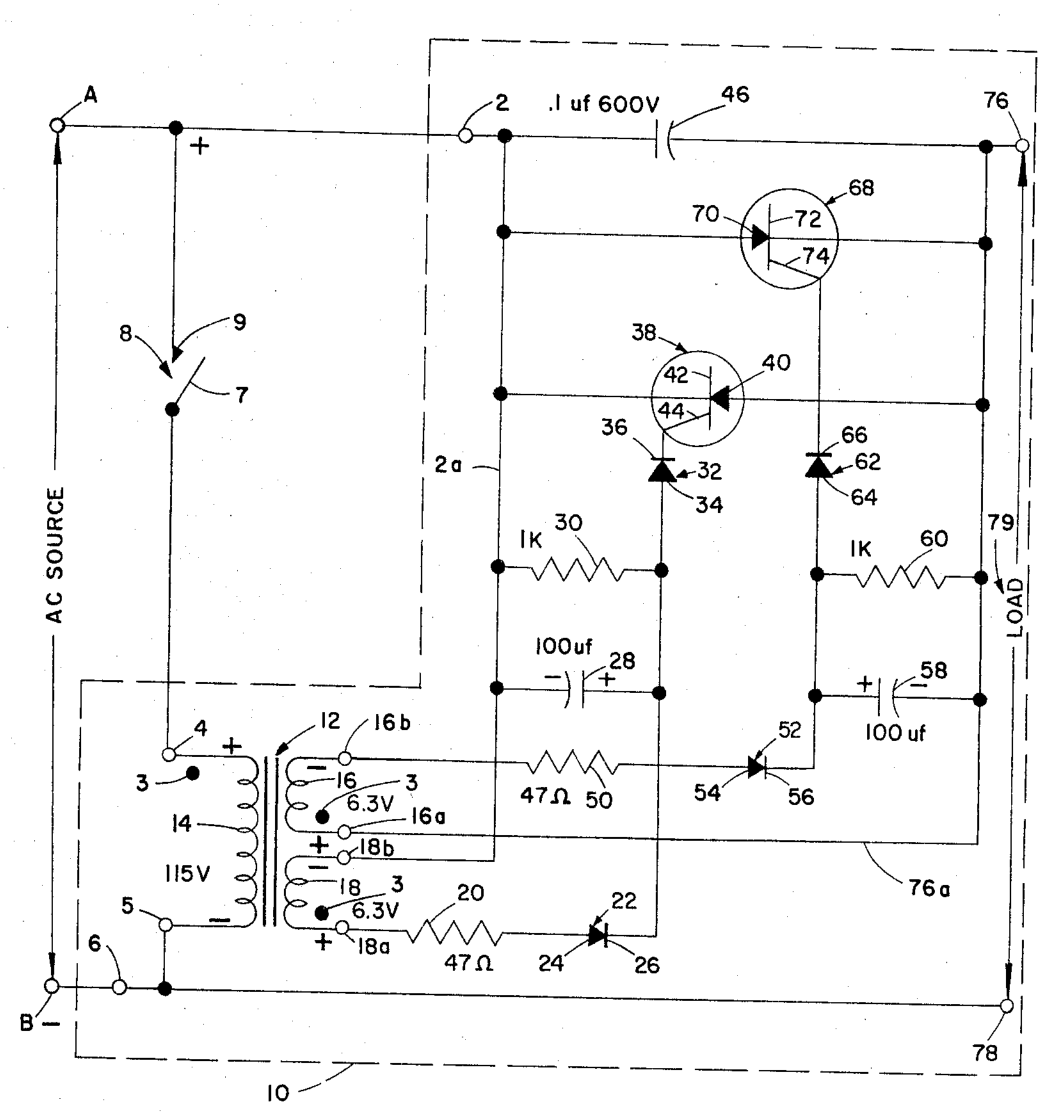
INVENTOR.
WILLIAM S. COOPER
BY Norman L. Chalfin
Agent
Edward O. Ansell
ATTORNEYS INVENTOR
WILLIAM S. COOPER
BY Norman L. Chalfin Agent
Edward O. Ansell
ATTORNEYS

United States Patent Office 3,283,177

Patented Nov. 1, 1966

3,283,177

INTERFERENCE-FREE A.-C. SWITCH

William S. Cooper, Sacramento, Calif., assignor to Aerojet-General Corporation, Azusa, Calif., a corporation of Ohio

Filed Sept. 2, 1964, Ser. No. 393,830
7 Claims. (Cl. 307—88.5)

Figure 2A:
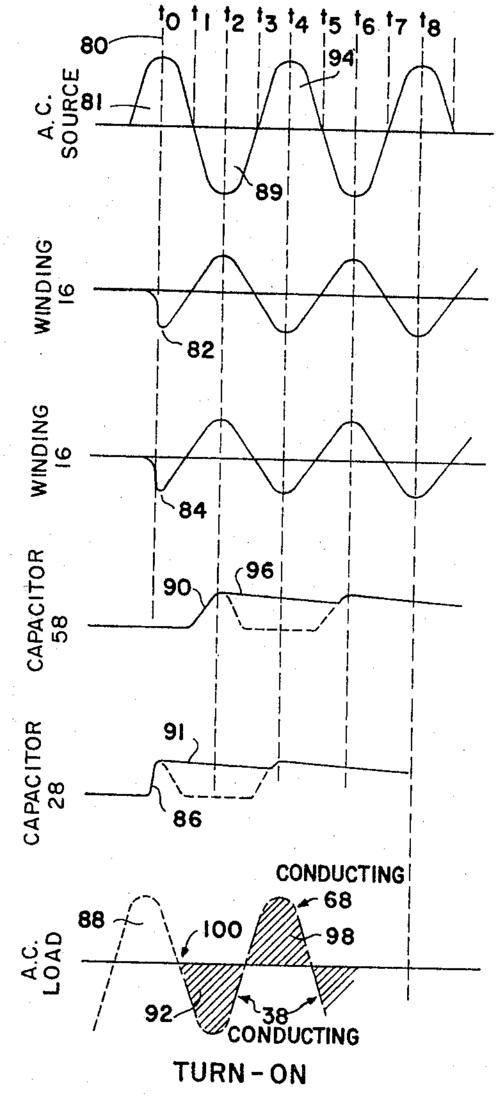

This invention relates to solid state switching device circuits and more particularly to a control circuit incorporating silicon-controlled rectifier switching devices by which the turn-on and turn-off switching transients are eliminated to provide a switching action substantially free from radio-frequency interference.

Turning off or turning on the A.-C. supply to inductive, resistive, lamp circuit or other high current loads can result in destructive transient impulses when the amplitude of the rise, or fall, of the power at the load circuit or device is very great. In the past, such turn-on or turn-off functions have been performed primarily by mechanical switches.

More recently, the development of the silicon-controlled rectifier (SCR) offers means whereby switching problems involving high currents may be overcome through the use of SCR switches. Some of these prior art switching means entailed massive mechanical structures. With the SCR switches, more compact and efficient structures are possible. These more compact and therefore lighter structures are particularly desirable in airborne and space vehicle where every saving in weight of operational equipments permits greater payloads and/or reduces fuel requirements.

The silicon-controlled rectifier (SCR) is a four-layer semiconductor device of PNPN configuration having three junctions—P-N, N-P, and P-N. They are sometimes considered as a PNP and NPN transistor with each enjoying one of their junctions in common. The anode of the SCR is the "P" element of the first junction, and the cathode of the SCR is the "N" element of the third junction. In the SCR, a gate signal is applied to the "P" element of the second and third junction. When a potential is applied between anode and cathode with the positive polarity at the anode and negative polarity at the cathode, practically no current can flow since the center junction is reverse biased while the outer junctions are forward biased. There is a leakage current, $I_{co}$, in the "off" condition which is very small. The total current in the external circuit is determined by the relationship:

$$I=\frac{I_{co}}{1-(a_1+a_2)} \qquad (1)$$

where $I$=total current $I_{co}$=leakage current at the reverse-biased (central) junction $a_1$ and $a_2$=current gains in forward-biased junctions considered as NPN or PNP transistors.

So long as $a_1+a_2$ is equal to .9, the total current will be 10 times the leakage current. But since the leakage current, $I_{co}$, can be made extremely small in a silicon PN junction, the total current will therefore be very small. This is the "off" condition of the SCR. When the current gains add up to nearly unity, the denominator of Equation 1 is almost zero and the total current, I, limited only by the load elements in the external circuit.

When a small forward biasing current is applied to the gate element, the current gain is increased until a voltage is reached at which an avalanche multiplication occurs and increases very rapidly until the total current is sufficient to maintain the sum $a_1+a_2 \geqq 1$ at which point the SCR becomes highly conductive and behaves as a P-N rectifier. This condition of high conduction (the "on" condition) prevails so long as the total current through the SCR remains above a critical minimum current called the holding current. If the current through the SCR falls below this holding current, the SCR will abruptly revert to the forward blocked or "off" condition. The "off" condition is generally achieved, once conduction has started, by a reverse voltage applied to the SCR. Removing the gate current, once conduction has started, has no effect, and the SCR continues to conduct indefinitely until something in the external circuit reduces the current below the holding value.

The turn-on action described above, wherein a small forward biasing current is applied to the cathode P-N junction, is described as "triggering" or "firing" of the SCR. The process by which the forward current is reduced below the holding current is called "commutation."

The rise-time on turn-on and fall-time on turn-off of an SCR is quite abrupt. The rise or fall in associated current is so rapid as to generate radio-frequency components which may be radiated to nearby circuits or coupled directly through power or other wiring.

In the prior art, suppression of the interfering radiation due to the rapid rise or fall of current on SCR turn-on, or turn-off has been attempted by shielding the unit containing SCR elements. In some cases radio-frequency blocking filters have been employed in the power line. One direct approach to eliminating the RF transient, which has been applied to the SCR circuit itself, has been to incorporate an appropriate series inductance in the SCR anode lead and an appropriate capacitor across both the inductance and SCR. The latter approach tends to impede the rate of rise in current.

The present invention contemplates novel circuit means associated with SCR switch devices with which A.C. power can be applied to and removed from various high current load equipments while substantially reducing or eliminating conducted or radiated radio-frequency (RF) interference caused by turn-on or turn-off transients.

In the present invention, two silicon controlled rectifiers are arranged in parallel but with opposite polarities across an A.C. switching circuit. Accurate control is maintained of the point with respect to the A.C. line voltage at which the SCR will be gated on. The two SCR's are designated "Positive SCR" and "Negative SCR."

Control of the gating point is accomplished by charging a gate voltage source capacitor for the positive SCR only during the negative half-cycle of the alternating current (A.C.) sine wave and charging a gate-voltage source capacitor for the negative SCR during the positive half-cycle of the A.C. sine wave. As a result, after a turn-on command signal, the conduction of each SCR is delayed until at least the next half-cycle. That is, each SCR will not turn on until immediately after the A.C. signal has passed through zero, and after the charging of the gate control voltage capacitor connected to it which has been charged by the previous half-cycle of opposite polarity. Thus A.C. power turn-on only occurs very close to the zero cross-over point of the A.C. sine wave half-cycle and so the rise or fall at turn-on will amount to a negligibly small amplitude and produce no radio-frequency interference type of radiation.

It is accordingly an object of this invention to provide an A.C. switching circuit substantially free of radio-frequency interference.

It is another object of this invention to provide a silicon controlled rectifier on-off control circuit for inductive, resistive and other loads which is substantially free from undesired radiation due to sharp transients.

It is still another object of this invention to provide means for gating SCR elements on and off by providing means which insures that the rise and fall times of the conduction of the SCR's correspond to appropriate polarities and the slope of the A.C. sine wave being applied to the load and the voltage being controlled by said SCR elements.

It is a further object of this invention to provide an SCR switching control for high-current A.C. loads substantially free from radio-frequency interference in which a command signal is applied to a step-down transformer having inverting dual secondaries, each secondary being arranged to develop and store a positive-going gate pulse to an SCR switching device on the preceding out-of-phase half-cycle of the A.C. sine-wave signal being applied to the switching device, the SCR being responsive to the gate signal only during the half-cycle following the development of the gate pulse.

It is a still further object of this invention to provide first and second gate-pulse charge and storage means responsive to respective and successive alternate half-cycles of an A.C. and connected to respective parallel oppositely poled SCR elements in series with an A.C. load, each said SCR being so poled as to respond to the gate pulses only during the half-cycle next following that in which the associated gate-pulse charge storage circuit therefor has achieved a potential sufficient to fire that SCR.

Figure 2B:
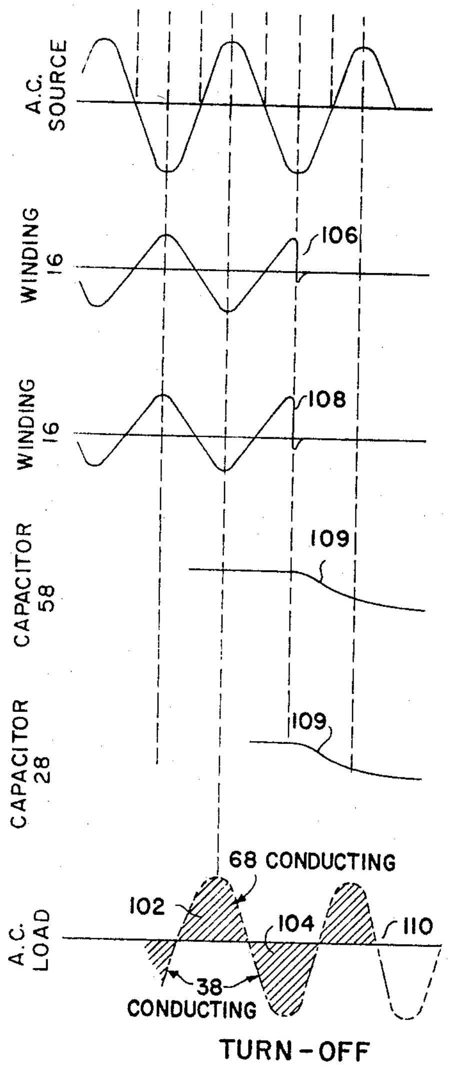

These and other objects of this invention will be more clearly evident from the specification which follows and the appended claims taken together with the accompanying drawings in which:

FIGURE 1 is a schematic circuit diagram of the interference-free switching system of this invention; and FIGURES 2*a* and 2*b* are waveform charts showing the time relationship of the signals involved in the operation of the invention.

In FIGURE 1, an A.C. power source A–B is seen to be connected to input terminals 2 and 6 of a switching control circuit 10 in accordance with this invention. The circuit 10 is enclosed in a broken line outline. Across the input 2–6, the primary 14 of a transformer 12 is connected in series with a single-pole single-throw switch 8, shown in an open circuit condition. A terminal 4 of transformer primary 14 is connected to the arm 7 of switch 8. The contact terminal 9 of switch 8 is connected to source input terminal 2. The other terminal 5 of transformer primary 14 is connected to source input terminal 6.

Transformer 12 has two secondary windings 16 and 18 on a common core but each independent of the other and each poled so as to provide a signal inverted in phase with respect to the other primary. This is shown by the location of dots 3 on primary and secondaries 16 and 18 and the +, − polarity identifications thereat. When the dot 3 (input terminal 4) side of primary winding 14 is positive with respect to terminal 5 then terminal **16*a* is positive with respect to terminal 16*b* of secondary winding 16 and terminal 18*a* is positive with respect to terminal 18*b* of secondary winding 18**.

The principal purpose of transformer 12 is to provide a pair of independent and phase-opposed signals to be used as hereinafter described. The phase-opposed signals may be rectified to produce appropriate gating signals for the SCR's.

In place of transformer 12 various other means for providing phase-opposed independent output signals may be used by those skilled in this art. An example of such other means is a common-emitter transistor phase-inverter in which the independent outputs are derived, respectively, from collector and emitter circuits and the input to the base thereof from a voltage divider network across the A.C. line.

Unijunction transistors may also be used in appropriate circuit configurations to derive therefrom independent phase-opposed output signals.

Across secondary winding 18, a half-wave rectifier circuit is connected including a current-limiting and timing resistor 20 connected to the dot 3 terminal at **18*a*, a diode 22 connected in series with resistor 20 to the positive terminal of a charging and storage capacitor 28. The negative terminal of capacitor 28 is connected to terminal 18*b* of transformer secondary 18 and A.C. power source input terminal 2. A load resistor 30 is connected in parallel with capacitor 28**.

Across secondary winding 16 of transformer 12, a similar half-wave rectifier circuit is connected in which a current limiting and timing resistor 50 is connected to non-dot terminal **16*b* of winding 16, a diode 52 is connected in series with resistor 50 to the positive terminal of a charging and storage capacitor 58. A load resistor 60 is connected in parallel with capacitor 58. The negative terminal of capacitor 58 is connected to terminal 16*a* of winding 16. Terminal 16*a* is also connected to switched ends 76 of the load circuit 79. The common end of load circuit 79 is at 78 connected to common terminal 6** of the input circuit.

A capacitor 46 is connected between input terminal 2 and load terminal 76. Capacitor 46 is thus in parallel with the SCR's 38 and 68 to suppress internally generated transients.

A first silicon controlled rectifier (SCR) 38 is connected between terminal 2 and terminal 76 with the cathode 42 thereof connected to terminal 2 and the anode 40 thereof to terminal 76.

The gate terminal 44 of the SCR 38 is connected through a coupling diode 32 to the positive terminal of capacitor 28. Coupling diode 32 is poled so that the anode 34 is connected to the positive terminal of capacitor 28 and the cathode 36 is connected to gate terminal 44. Thus only when the potential on the anode 34 of diode 32 is positive with respect to the cathode 36 will there be any transfer of gate signal to gate terminal 44.

A second SCR 68 is also connected between input terminal 2 and load terminal 76, but SCR 68 is oppositely poled with respect to SCR 38. The anode 70 of SCR 68 is connected to terminal 2. The gate terminal 74 of SCR 68 is connected through coupling diode 62 to the positive terminal of capacitor 58. Coupling diode 62 is poled so that anode 64 thereof is connected to capacitor 58 and cathode 66 thereof is connected to gate terminal 74. Thus, only when the potential of anode 64 is positive with respect to cathode 66 of diode 62 will there be any transfer of gate signal to gate terminal 74.

From the above, it may be seen that the control circuit comprises an A.C. source circuit A–B connected to input terminals 2, 6 of the control circuit 10 of this invention. The output or load 79 is connected to terminals 76, 78. The terminals 78 and 6 are common. Between terminal 2 and terminal 76, the switching circuit comprising SCR's 38 and 68 is connected along with the associated gating control circuits for each. The parallel connected but oppositely poled SCR's 38 and 68 are in series with terminals 2 and 76.

The gating control circuits comprise the respective rectifier networks connected to the secondary windings 16 and 18 of transformer 12 and coupled respectively to gate terminals 74 and 44 of SCR's 68 and 38, respectively.

The operation of the system shown in FIGURE 1 and described in detail above will be better understood in the following discussion thereof with reference to both FIGURES 1 and 2. In FIGURE 2, waveforms of the currents or signals involved with respect to time have been drawn to aid in the discussion.

FIGURE 2 is illustrated in two related parts side-by-side. At the left (FIG. 2*a*) the waveforms of signal present during the turn-on phase of operation of the invention are shown, and at right (FIG. 2*b*) the waveforms related to turn-off phase of operation are shown.

In operating the invention, switch 8 (FIG. 1) is actuated by closing arm 7 against contact 9 to complete the circuit from terminal A to terminal B across the primary 14 of transformer 12 applying the power line A.C. current across primary 14 at time $t_0$ as indicated at 80 in FIGURE 2*a*.

For the ensuing discussion, it is assumed that the A.C. current at 80 (FIG. 2*a*) applied to primary 14 is of positive polarity (+) at terminal 4 and negative polarity (−) at terminal 5 so that there is induced on secondaries 16 and 18 a stepped-down A.C. signal with the polarities inverted with respect to the primary polarity as shown at 16*a*, 16*b*, and 18*a*, 18*b*. The corresponding waveforms are shown at 82 and 84 respectively in FIGURE 2*a*. Thus the anode 54 of diode 52 will have a negative polarity with respect to return line 76*a*, and anode 24 of diode 22 will have a positive polarity with respect to return line 2*a*.

Diode 22 therefore will conduct on the initial rise of current which charges capacitor 28 in the manner shown in waveform 86 in FIGURE 2*a*. The time constant of the RC discharge path represented by capacitor 28 and resistor 30 in parallel therewith is very long compared to the period of the alternation cycle of the A.C. signal applied to diode 22 so that the charge remains on diode 22 over the next cyclic alternation interval, and by virtue of the half-wave rectification action of diode 22, capacitor 28 will retain a charge relatively constant until A.C. power is removed from winding 14 and therefore also from winding 18. During this initial half cycle 81 or the portion thereof during which power is applied, there is no conduction of the A.C. potential applied between terminals 2 and 6 across SCR's 38 and 68 to load 79. This is shown at 88 in FIGURE 2*a*.

During the next (negative) half-cycle 89 of the primary power applied to primary 14, the polarity of the potential appearing on secondaries 16 and 18 is inverted so that the non-dot ends (16*b* of winding 16, and 18*b* of winding 18) are now positive resulting in non-conduction of diode 22 and conduction of diode 52 in the same manner as diode 22 was conducting on the preceding half-cycle. Capacitor 58 is now charged up as can be seen at 90 in FIGURE 2*a*. Capacitor 58 and resistor 60 are similar to capacitor and resistor 28 and 30 in that capacitor 58 retains its charge over the alternate successive half-cycles of A.C. potential in winding 16.

As has been previously explained, an SCR remains non-conductive until an appropriate forward gating potential is applied to the gating terminal thereof. Thus, during a negative half-cycle (with respect to the direction in which the SCR is poled) no conduction occurs. When a coincidence of forward bias and forward gating potential are present on the SCR, the SCR acts like a diode and conducts during the half-cycle in which the coincidence occurs.

Accordingly, during the later half of half-cycle 81 (FIG. 2*a*) at the peak of which power has been applied, as indicated at 80, to primary 14, neither SCR 38 nor 68 becomes conducting (as indicated at 88) because the polarity of the potential on anode 70 of SCR 68 is positive with respect to cathode 72 thereof, and capacitor 58 has no charge upon it because diode 52 is non-conducting during this half-cycle. The polarity of potential applied to cathode 42 of SCR 38 is positive with respect to anode 40 so that even with the forward-bias between cathode 42 and gate terminal 44 developed across RC network 28, 30, SCR 38 is not conducting because the SCR is itself reverse-biased.

During the next full positive half-cycle 94 of the A.C. source A–B applied to the terminals 2–6, SCR 68 now has a positive potential on the anode 70 thereof with respect to the cathode 72 thereof, and there is a forward gating signal applied to gate terminal 74 across coupling diode 62 from capacitor 58 and SCR 68 now conducts on the positive half-cycle of A.C. power from source A–B applied to terminals 2 and 6 to load 79 across terminals 76 and 78 as shown at 98 in FIGURE 2*a*.

The rise in conduction of SCR's 38 and 68 on the respective succeeding half-cycles, after a gate potential has been developed on respective capacitors 28 and 58, can only start at a time $t_1$ or $t_3$ in the cycle after the zero crossovers, as indicated at 100 in FIGURE 2*a*, because of the configuration of this circuit, thereby eliminating the sharp transient which otherwise would have accompanied the sharp turn-on rise occurring at $t_0$ indicated at 82 and 84 in FIGURE 2*a*.

Similarly as may be seen in FIGURE 2*b* on turn-off, following a conduction cycle 102 for SCR 68, on the succeeding positive-half-cycle, during which the conduction of SCR 38 occurs, if A.C. power is now removed by opening switch 8, as indicated at 106 and 108, the resulting drop in potential terminates the successive charging of capacitors 28 and 58. Both capacitors 28 and 58 discharge through their respective load resistors 30 and 60 over a time period which may be greater than the succeeding ½ cycle as indicated at 109 and which will depend on the value of resistors 30 and 60. If resistors 30 and 60 are relatively large the discharge may continue for more than one cycle. As has been previously explained, once an SCR has been "fired" or "triggered" by an appropriate gating signal, removing the gating signal does not terminate its conduction. Thus, until capacitors 28 and 58 have discharged below the firing potential for SCR's 38 and 68, the SCR's will continue to conduct. Then, on the half-cycle next following the fall of gate potential below the firing or holding potential value, conduction of the respective SCR's 38 and 68 will cease as the last half-cycle during which the gate signal for each SCR was present crosses the zero potential line of the A.C. current source, as shown at 110, thereby eliminating the sudden drop in potential at turn-off.

Since the rise and fall in current applied to the load through SCR's 38 and 68 follows the A.C. waveform, no sharp transition in turn-on or turn-off of the SCR's occurs. Therefore, when using the above described invention, no switching transients are developed of such nature that radio-frequency interference is generated.

What I claim is:

1. A silicon-controlled gated rectifier switching system comprising:

a source of alternating current having at least a current lead, and a common lead;

a first gated silicon-controlled rectifier means connected in series with said current lead and poled so as to be conductive, only during the concidence of a first forward-biasing gating signal and the positive half-cycles of the alternating current in said source;

a second gated silicon-controlled rectifier means connected in parallel with said first gated silicon-controlled rectifier means and poled so as to be conductive only during the coincidence of second forward-biasing gating signal and the negative half-cycles of the alternating current in said source;

phase-inverting means coupled to said source for developing alternating-current signals which are opposite in phase with respect to said source;

first forward-biasing-signal generating means connected to said phase inverting means in such polarity as to produce a first positive direct-current gating potential on the half-cycle of the alternating current in said phase-inverting means corresponding to negative half-cycles of said source, said first forward-biasing signal generating means being connected to said first gated silicon-controlled rectifier;

second forward-biasing-signal generating means connected to said phase-inverting means in such polarity as to produce a second positive direct-current gating potential on the half-cycle of the alternating current in said phase-inverting means corresponding to the positive half-cycle in said source, said second forward-biasing-signal generating means being connected to said second gated silicon-controlled rectifier; and, a load device being connected between said parallel connection of said silicon-controlled rectifiers and said common lead of said alternating-current source, whereby when alternating current from said source is applied to said phase-inverting means said first gating potential is applied to said first gated silicon-controlled rectifier which does not conduct until there is coincidence of said first gating potential with a succeeding positive half cycle of said source whereupon conduction of said first silicon-controlled rectifier occurs beginning at the initiation of said succeeding positive half-cycle of said source and on succeeding positive half-cycles thereafter, and said second gating potential is applied to said second gated silicon-controlled rectifier which does not conduct until there is coincidence of said second gating potential with a next-following negative half-cycle of said alternating-current source whereupon conduction of said second silicon-controlled rectifier occurs beginning at the initiation of said next-following negative half-cycle of said alternating-current source and on negative half-cycles of said source following thereafter, so that alternating current from said source may be applied to said load, and when said alternating current from said source is removed from said phase-inverting means said first silicon-controlled rectifier will no longer conduct at the beginning of the first negative half-cycle thereafter, at which said coincidence is not present, and said second silicon-controlled rectifier will no longer conduct at the beginning of the first positive half-cycle thereafter, at which said coincidence is not present, thereby removing said alternating current from said load, said application of said alternating current thereby to said load occurring on the rise of a positive or negative half-cycle without sudden change and the removal of said alternating current from said load occurring on the fall of a half-cycle without sudden change, so as to eliminate high-frequency interference producing transients.

2. A silicon-controlled gated rectifier switching system comprising:

a source of alternating current having a current lead, and a common lead;

a first gated silicon-controlled rectifier connected in series with said current lead and poled so as to be conductive during the coincidence of a first forward-biasing gating signal and the positive half-cycles of the alternating current in said source;

a second gated silicon-controlled rectifier connected in parallel with said first gated silicon-controlled rectifier and poled so as to be conductive during the coincidence of a second forward-biasing gating signal and the negative half-cycles of the alternating current in said source;

phase-inverting means coupled with said source for developing alternating-current signals which are opposite in phase with respect to said source;

first rectifier-circuit means including first charge-storage means connected to said phase-inverting means in such polarity as to produce a first positive direct-current gating potential on the half-cycle of the alternating current in said phase inverting means corresponding to the concurrent negative half-cycle of said source, said first gating potential being stored in said charge-storage means, said first rectifier-circuit means being connected to said first gated silicon-controlled rectifier;

second rectifier-circuit means including second charge-storage means connected to said phase-inverting means in such polarity as to produce a second positive direct-current gating potential on the half-cycle of the A.C. current in said phase-inverting means corresponding to the concurrent positive half-cycle in said source, said second gating potential being stored in said second charge-storage means, said second rectifier-circuit means being connected to said second gated silicon-controlled rectifier; and a load device being connected between said parallel connection of said silicon-controlled rectifiers and said common lead of said alternating-current source, whereby when alternating current from said source is applied to said phase-inverting means, said first gating potential is applied to said first gated silicon-controlled rectifier during a negative half-cycle of said alternating-current source and remains thereon due to said first charge-storage means until the coincidence of the next positive half-cycle, and said first gating potential on said first silicon-controlled rectifier occurs to cause said first silicon-controlled rectifier to conduct on each following positive half-cycle of said source thereafter, and said second gating potential is applied to said second gated silicon-controlled rectifier to remain thereon due to said second charge-storage means until the coincidence of the next negative half-cycle, and said second gating potential on said second silicon-controlled rectifier occurs to cause said second silicon-controlled rectifier to conduct on said next-following negative half-cycle and on each following negative half-cycle of said source thereafter, so that alternating current from said source may be applied to said load, and when said alternating current from said source is removed from said phase-inverting means both said charge-storage means will discharge and said first silicon-controlled rectifier will cease conduction at the beginning of the first negative half-cycle at which said first charge-storage means is discharged below a predetermined potential and said second silicon-controlled rectifier will cease conduction at the beginning of the first positive half-cycle at which said second charge-storage means is discharged below said predetermined potential thereby removing said alternating current from said load, said application of said alternating current thereby to said load occurring on the rise of a positive or negative half-cycle without sudden change and the removal of said alternating current from said load occurring on the fall of a half-cycle without sudden change, so as to eliminate high-frequency interference producing transients.

3. An interference-free silicon-controlled gated-rectifier switching system for applying alternating current to a load and removing said current from said load, said system comprising:

a source of alternating current having at least a current lead and a common lead;

a first gated silicon-controlled rectifier connected in series with said current lead and poled so as to be conductive, when gated, only on the positive half-cycles of the alternating current in said source;

a second gated silicon-controlled rectifier connected in parallel with said first gated silicon-controlled rectifier and poled so as to be conductive when gated, only on the negative half-cycles of the alternating current in said source;

alternating-current signal-inverting means for developing phase-opposed alternating-current signals coincident but out-of-phase with said alternating current in said source;

an on-off switch interconnecting the signal-inverting means and the source of alternating current;

a first gating-signal-circuit means having a first storage network therein and being responsive to a predetermined polarity of said phase-opposed alternating-current signals to produce a first positive direct current gating potential on the half-cycle of the alternating current in said signal-inverting means corresponding to the concurrent negative half-cycle in said source, said first gating potential being stored in said storage network, said first gating-signal-circuit means being connected to said first gated silicon-controlled rectifier;

a second gating-signal-circuit means having a second storage network therein and being responsive to the opposite polarity of said phase-opposed alternating-current signals to produce a second positive direct-current gating potential on the half-cycle of the alternating current in said signal-inverting means corresponding to the concurrent positive half-cycle in said source, said second gating potential being stored in said second storage network, said second gating-signal-circuit means being connected to said second gated silicon-controlled rectifier; and a load device being connected between said parallel connection of said silicon-controlled rectifiers and said common lead of said alternating-current source, whereby when alternating current is applied to said signal-inverting means said first gating potential is applied to said first gated silicon-controlled rectifier during a negative half-cycle of said alternating-current source to remain thereon due to said first storage network until the succeeding positive half-cycle, whereupon conduction of said first gated silicon-controlled rectifier occurs beginning at the initiation of said succeeding positive half-cycle and on each succeeding positive half-cycle thereafter, and said second gating potential developed during said succeeding positive half-cycle of said alternating-current source will be applied to said second gated silicon-controlled rectifier to remain thereon until the next-following negative half-cycle of said alternating current source due to said second storage network whereupon conduction of said second silicon-controlled rectifier occurs beginning at the initiation of said next-following negative half-cycle of said alternating current source and each following negative half-cycle of said source thereafter, so that alternating current from said source may be applied to said load, and when said on-off switch is open to remove said alternating current from said signal-inverting means, both said storage networks will discharge and said first silicon-controlled rectifier will cease conduction at the beginning of the first positive half-cycle at which said second storage network is discharged below said predetermined potential thereby removing said alternating current from said load, said application of said alternating current thereby to said load occurring on the rise of a positive or negative half-cycle without sudden change and the removal of said alternating current from said load occurring on the fall of a half-cycle without sudden change, so as to eliminate high-frequency interference producing transients.

4. A silicon-controlled gated-rectifier switching system comprising:

a source of alternating current having at least a current lead, and a common lead;

a first gated silicon-controlled rectifier connected in series with said current lead and poled so as to be conductive, only on the positive half-cycles of the alternating current in said source when a forward-biasing gating signal is also present thereon;

a second gated silicon-controlled rectifier connected in parallel with said first gated silicon-controlled rectifier and poled so as to be conductive only on the negative half-cycles of the alternating current in said source when a forward-biasing gating signal is also present thereon;

a transformer having a primary winding and a pair of secondary windings, both said secondary windings developing alternating current from said source which is opposite in phase with respect to said source, said primary winding being connected from said common lead of said source through an on-off switch to said current lead of said source;

a first half-wave rectifier circuit including a first diode and first charge-storage network connected to one of said secondary windings in such polarity as to produce a first positive direct-current gating potential on the half-cycle of the current in said one secondary corresponding to the concurrent negative half-cycle in said primary winding, said first gating potential being stored in said first charge-storage network, said first half-wave rectifier circuit being connected to said first gated silicon-controlled rectifier;

a second half-wave rectifier circuit including a second diode and second charge-storage network connected to the other of said secondary windings in such polarity as to produce a second positive direct-current gating potential on the half-cycle of the alternating current in said other secondary corresponding to the concurrent positive half-cycle in said primary winding, said second gating potential being stored in said second charge-storage network, said second half-wave rectifier circuit being connected to said second gated silicon-controlled rectifier; and a load device being connected between said parallel-connected silicon-controlled rectifiers and said common lead of said alternating current source, whereby when said on-off switch in said primary winding is closed and alternating current thereby applied to said primary winding, said first gating potential will be applied to said first gated silicon-controlled rectifier during a negative half-cycle of said alternating current source and remain thereon due to the charge on said first storage network until the succeeding positive half-cycle whereupon conduction of said first silicon-controlled rectifier occurs beginning at the initiation of said succeeding positive half-cycle and on each positive half-cycle following thereafter, and said second gating potential developed during said succeeding positive half-cycle of said alternating current source will be applied to said second gated silicon-controlled rectifier to remain thereon until the next following negative half-cycle of said alternating current source due to said second storage network whereupon conduction of said second silicon-controlled rectifier occurs beginning at the initiation of said next-following negative half-cycle of said alternating current source and each negative half-cycle of said source following thereafter, so that alternating current from said source may be applied to said load, and when said on-off switch is open to remove said alternating current from said primary winding, both said storage networks will discharge and said first silicon-controlled rectifier will cease conduction at the beginning of the first negative half-cycle at which said first storage network is discharged below a predetermined potential and said second silicon-controlled rectifier will cease conduction at the beginning of the first positive half-cycle at which said second storage network is discharged below said predetermined potential thereby removing said alternating current from said load, said application of said alternating current thereby to said load occurring on the rising slope of a positive or negative half-cycle without sudden change and the removal of said alternating current from said load occurring on the falling slope of a half-cycle without sudden change, so as to eliminate high-frequency interference producing transients.

5. An interference-free switching system for switching an alternating current source on and off as applied to alternating current loads, particularly loads which are in or near interference sensitive devices, said switching system comprising:

gated switching means connected in series with one leg of the alternating current source and being responsive to predetermined gating signals to become conductive on successive alternate half-cycles;

a load circuit connected between said gated switching means and another leg of said alternating current source; and dual gate-signal-generating means switchably connected to said source of alternating current for generating independent predetermined gating signals on either half-cycle of the current in said alternating current source, said gate-signal-generating means being connected to said gated switching means to apply said independent predetermined gating signals to said gated switching means on said successive alternate half-cycles of said source without developing transients therein when applying said alternating current to said load in response to said signals, or removing said alternating current from said load when said signals are terminated, said load being thereby switched on or off without generating or radiating interference signals.

6. An interference-free switching system for switching a single-phase alternating current source on and off as applied to alternating current loads, particularly loads which are in or near interference-sensitive devices; said switching system comprising:

a pair of gated-switching means connected in series with one leg of the alternating current source and each of said switching means being respectively responsive to predetermined gating signals to become conductive;

a load circuit connected between said gated switching means and the other leg of said alternating current source; and a pair of gate-signal-generating means switchably connected to said source of alternating current, for generating independent, predetermined gating signals on either half-cycle of the current in said alternating current source, said gate-signal-generating means being connected to respective ones of said gated switching means to apply appropriate ones of said independent predetermined gating signals to said gated switching means on alternate half-cycles of said source without developing transients therein to gate said gated switching means on so as to apply said alternating current to said load.

7. An interference-free switching system for switching a single-phase alternating current source on and off as applied to alternating current loads, particularly loads which are in or near interference-sensitive devices; said switching system comprising:

first and second gated-switching means connected in parallel with one another and in series with one leg of the alternating current source, said first switching means being poled to conduct on positive half-cycles, said second switching means being poled to conduct on negative half-cycles and each being responsive to predetermined gating signals to become conductive on said respective half-cycles of current from said source;

a load circuit connected between said parallel connected gated switching means and the other leg of said alternating current source; and dual gate-signal-generating means switchably connected to said source of alternating current and including first and second gate potential circuits for generating and storing independent, predetermined gating signals during the half-cycle of the current in said alternating current source when each of said respective first and second gated switching means is nonconductive, said first and second gate potential circuits being connected to said gated switching means so as to apply said stored, independent, predetermined gating signals to said respective first and second gated switching means on the succeeding alternative half-cycle when each said respective switching means is conductive to apply said alternating current to said load circuit, said alternating current being applied to said load circuit only during the simultaneous presence of said respective gating signals and the conductive half-cycles of said respective first and second gated switching means, whereby current to said loads follows the rise and fall of the waveform of said alternating current in said source so that no abrupt application to, or removal of current from, said load occurs, thereby eliminating transients and high-frequency interference resulting therefrom.

References Cited by the Examiner

UNITED STATES PATENTS

| | | | |
|---|---|---|---|
| 2,169,023 | 8/1939 | Dawson | 315—197 X |
| 2,516,422 | 7/1950 | Rockafellow | 328—77 |
| 3,097,314 | 7/1963 | Harriman | 307—88.5 |
| 3,103,618 | 9/1963 | Slater. | |
| 3,159,753 | 12/1964 | Anderson et al. | 307—88.5 |
| 3,204,113 | 8/1965 | Snygg | 307—88.5 |

ARTHUR GAUSS, *Primary Examiner.*

R. H. EPSTEIN, I. C. EDELL, *Assistant Examiners.*